(12) United States Patent
Mori

(10) Patent No.: US 7,951,484 B2
(45) Date of Patent: May 31, 2011

(54) BATTERY CAN, METHOD FOR PRODUCING THE SAME, AND BATTERY

(75) Inventor: Katsuhiko Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/519,651

(22) PCT Filed: Dec. 3, 2008

(86) PCT No.: PCT/JP2008/003572
§ 371 (c)(1),
(2), (4) Date: Jun. 17, 2009

(87) PCT Pub. No.: WO2009/081526
PCT Pub. Date: Jul. 2, 2009

(65) Prior Publication Data
US 2010/0330414 A1    Dec. 30, 2010

(30) Foreign Application Priority Data
Dec. 21, 2007  (JP) .................. 2007-330525

(51) Int. Cl.
*H01M 2/02*   (2006.01)
*B21B 45/04*  (2006.01)

(52) U.S. Cl. .............................. 429/164; 72/39; 428/687
(58) Field of Classification Search ................... 429/63, 429/164, 165, 167, 189, 169; 72/39; 413/1; 428/687
See application file for complete search history.

(56) References Cited

U.S. PATENT DOCUMENTS 5,001,915 A  *  3/1991  Blazevic ........................ 72/39
6,295,852 B1 * 10/2001  Kipping et al. ................ 72/39

FOREIGN PATENT DOCUMENTS

| JP | 09-111485   | 4/1997 |
| JP | 10-255817   | 9/1998 |
| JP | 2003-080632 | 3/2003 |
| JP | 2003-173803 | 6/2003 |
| JP | 2006-066113 | 3/2006 |

* cited by examiner

*Primary Examiner* — Stephen J. Kalafut
(74) *Attorney, Agent, or Firm* — McDermott Will & Emery LLP

(57) ABSTRACT

The method for producing a battery can according to this invention includes the steps of: (1) producing a battery can having a cylindrical side wall, a bottom, and an opening from a steel plate by a can-making process; (2) washing the battery can with tap water or industrial water; (3) washing the battery can with water having a conductivity of 80 μS/cm or less after the step (2); and (4) drying the battery can after the step (3).

17 Claims, 3 Drawing Sheets ously washed with tap water or industrial water to remove anything adhering to the battery can surface. The battery cans are then dried to prevent the battery can surface from rusting due to water adhering to the battery cans.

BATTERY CAN, METHOD FOR PRODUCING THE SAME, AND BATTERY

RELATED APPLICATIONS

This application is the U.S. National Phase under 35 U.S.C. §371 of International Application No. PCT/JP2008/003572, filed on Dec. 3, 2008, which in turn claims the benefit of Japanese Application No. 2007-330525, filed on Dec. 21, 2007, the disclosures of which Applications are incorporated by reference herein.

TECHNICAL FIELD

The invention relates to a battery can and a method for producing the same, and particularly to a method for washing a battery can that is produced from a steel plate by a can-making process. The invention also pertains to a battery using this battery can.

BACKGROUND ART

In the production process of battery cans, battery cans produced from a steel plate by a can-making process are usually washed with tap water or industrial water to remove anything adhering to the battery can surface. The battery cans are then dried to prevent the battery can surface from rusting due to water adhering to the battery cans.

However, tap water or industrial water contains relatively large amounts of Ca or Mg. Thus, after the battery cans are washed, even if the water is removed by drying, the Ca or Mg contained in the tap water or industrial water may remain on the battery can surface, thereby causing the battery can surface to rust.

As a method for preventing battery cans from rusting, for example, Patent Document 1 proposes applying a rust inhibitor to a battery can surface to form a protective film. However, this increases the production cost. Also, the protective film may act as a resistance film which increases the contact resistance of the terminal section of the battery can.

Also, for example, Patent Document 2 proposes a method for suppressing the formation of rust due to liquid electrolyte which has adhered to a battery surface in the liquid electrolyte injection step. In this method, after a battery is produced, the battery is washed with pure water and then dried at or below room temperature in a low dew-point atmosphere.

Patent Document 1: Japanese Laid-Open Patent Publication No. Hei 09-111485
Patent Document 2: Japanese Laid-Open Patent Publication No. Hei 10-255817

DISCLOSURE OF THE INVENTION

Problem To be Solved by the Invention

Patent Document 2 uses pure water having a low Ca or Mg content to wash the completed battery into which the liquid electrolyte has been injected. It should be noted, however, that pure water is not used to wash the battery can that has been just produced. Hence, during the storage of the battery can or during the interval between the production of the battery can and the fabrication of a battery using the battery can, the Ca or Mg contained in the tap water or industrial water used to produce the battery can may cause the battery can surface to rust. Such rust formation may lower the quality of the battery can.

As described above, after a battery is fabricated, the battery can used therein is washed as the battery with pure water. Thus, the Ca or Mg contained in the tap water or industrial water used to produce the battery can remains particularly on the inner face of the battery can, so the inner face of the battery can is susceptible to rust. When the inner face of the battery can rusts, iron oxide may drop from the battery can. Hence, an alkaline dry battery may leak due to gas evolution. Also, a lithium secondary battery may short-circuit internally. Further, in an alkaline storage battery and a lithium secondary battery, when an electrode lead connected to an electrode is welded to an electrode terminal, the welding may not be done properly, or the contact resistance of the terminal section may increase.

In order to solve the above-described problems with conventional art, it is therefore an object of the invention to provide a method for producing a battery can which is capable of suppressing the formation of rust on the battery can surface in an easy and reliable manner. It is another object to provide a highly reliable battery can that is free from rust formation.

Means for Solving the Problem

The method for producing a battery can according to the invention includes the steps of: (1) producing a battery can having a cylindrical side wall, a bottom, and an opening from a steel plate by a can-making process; (2) washing the battery can with tap water or industrial water; (3) washing the battery can with water having a conductivity of 80 µS/cm or less after the step (2); and (4) drying the battery can after the step (3).

The conductivity of the water used in the step (3) is preferably 1 to 20 µS/cm.

The conductivity of the water used in the step (3) is more preferably 1 to 8 µS/cm.

The temperature of the tap water or industrial water used in the step (2) is preferably 35 to 70° C.

It is preferable to use a water-soluble lubricant in the can-making process.

Also, the invention pertains to a battery can having a cylindrical side wall, a bottom, and an opening and comprising a steel plate, wherein the amount of Ca adhering to a surface of the battery can is 0.007 µg/cm$^2$ or less.

The amount of Ca is preferably 0.0051 µg/cm$^2$ or less.

The invention relates to a battery can having a cylindrical side wall, a bottom, and an opening and comprising a steel plate, wherein the amount of Mg adhering to a surface of the battery can is 0.0004 µg/cm$^2$ or less.

The amount of Mg is preferably 0.00028 µg/cm$^2$ or less.

Further, the invention pertains to a battery including the aforementioned battery can.

Effect of the Invention

According to the invention, it is possible to provide a method for producing a battery can which is capable of suppressing the formation of rust on the battery can surface in an easy and reliable manner. It is also possible to provide a highly reliable battery can that is free from rust formation. Further, the use of this battery can permits an improvement in battery reliability.

BEST MODE FOR CARRYING OUT THE INVENTION

Figure 1:
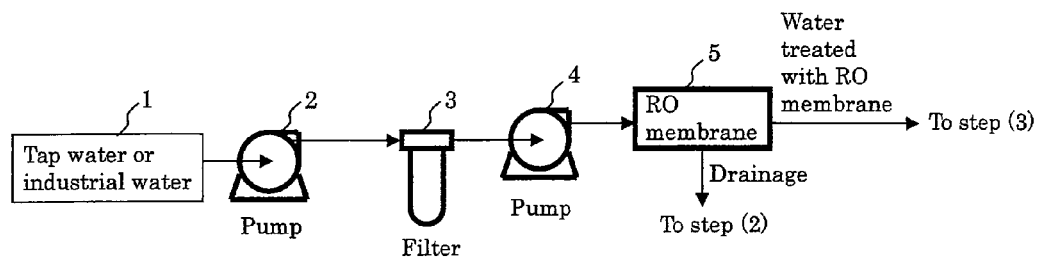
FIG. 1 is a schematic flow chart showing a method for preparing washing water used in the washing step of a battery can in a battery can production method of the invention.

The method for producing a battery can according to the invention includes the steps of: (1) producing a battery can having a cylindrical side wall, a bottom, and an opening from a steel plate by a can-making process; (2) washing the battery can with tap water or industrial water; (3) washing the battery can with water having a conductivity of 80 µS/cm or less after the step (2); and (4) drying the battery can after the step (3).

In the step (3), Ca and Mg contained in the tap water or industrial water which has adhered to the battery can surface in the washing step (2) are removed. This can suppress the formation of rust on the battery can surface (outer face and inner face) due to the Ca and Mg contained in the tap water or industrial water in an easy and reliable manner. Also, since there is no need to make a major change in the production process of the battery can, a cost increase due to a capital investment in equipment can be suppressed.

This production method can provide a rust-free, highly reliable, low cost battery can. Further, when the battery can serves as an electrode terminal, an increase in the contact resistance of the terminal section of the battery due to rusting of the terminal section is suppressed, so that the reliability of the battery improves.

In the step (1), for example, a steel plate is drawn and ironed. For example, DI process (Drawing and Ironing) is used as the can-making process, since it can enhance the productivity of the battery can while reducing the costs. According to DI process, a cup-shaped inte mediate work product is produced by a deep drawing step using a press, and the cup-shaped intermediate work product is successively drawn and ironed at one time, to obtain a battery can of predetermined shape having a cylindrical side wall, a bottom, and an opening.

In the step (1), it is preferable to use a water-soluble lubricant to assist the process of the steel plate and prevent the steel plate from breaking in the process. The water-soluble lubricant can be, for example, SE-65CPS available from SUGIMURA Chemical Industrial Co., Ltd., or CFS-100 available from NEOS COMPANY LIMITED.

The steel plate used in the step (1) can be, for example, a steel plate that is obtained by nickel plating a cold-rolled steel plate composed mainly of Fe. In addition to Fe, the steel plate may contain, for example, small amounts of elements such as carbon, phosphorus, manganese, aluminum, silicon, or sulfur. When the steel plate contains carbon or phosphorus, it has good hardness or machinability. The carbon content in the steel plate is preferably 0.002 to 0.08% by weight. The phosphorus content in the steel plate is preferably 0.01 to 0.03% by weight. When the steel plate contains manganese, it has good strength. The manganese content in the steel plate is preferably 0.01 to 0.4% by weight. Aluminum is added to the steel plate as a deoxidizer. The aluminum content in the steel plate is preferably 0.03 to 0.08% by weight.

In the step (2), materials having adhered to the battery can surface (outer face and inner face) in the step (1), such as the aqueous lubricant, are removed. In the step (2), tap water or industrial water is used as the water to wash the battery can. The temperature of the tap water or industrial water used in the step (2) is preferably 35 to 70° C., and more preferably 40 to 60° C. The conductivity of the tap water or industrial water is approximately 200 µS/cm.

In the step (3), Ca and Mg contained in the tap water or industrial water which has adhered to the battery can surface (outer face and inner face) in the washing step (2) are removed. In the step (3), water having a conductivity of 80 µS/cm or less is used as the water to wash the battery can. The smaller the Ca and Mg contents in water are, the lower the water conductivity is. When the conductivity of the washing water is 80 µS/cm or less, the amount of Ca adhering to the surface of the battery can obtained by the above production method is 0.007 µg/cm$^2$ or less, and the amount of Mg is 0.0004 µg/cm$^2$ or less.

The temperature of the water having a conductivity of 80 µS/cm or less used in the step (3) is, for example, 10 to 30° C. If the conductivity of the washing water exceeds 80 µS/cm, the Ca and Mg contents in the washing water increase and the amounts of Ca and Mg adhering to the battery can surface increase. As a result, the battery can surface is susceptible to rust. The conductivity of ultrapure water, in which the contents of Ca and Mg in water are on the minimum level, is approximately 0.1 µS/cm.

The conductivity of the washing water is preferably 1 to 20 µS/cm, since the amounts of Ca and Mg adhering to the battery can surface can be further reduced. More preferably, the conductivity of the washing water is 1 to 8 µS/cm. When the conductivity of the washing water is 8 µS/cm or less, the contact resistance of the electrode terminal of the battery can be significantly reduced. If the conductivity of the washing water is less than 1 µS/cm, the running cost on the mass production level becomes high in the production process. When the conductivity of the washing water is 8 µS/cm or less, the amount of Ca adhering to the surface of the battery can obtained by the above production method is 0.0051 µg/cm$^2$ or less, and the amount of Mg is 0.00028 µg/cm$^2$ or less.

In the step (4), the battery can is dried to remove the water which has adhered to the battery can surface in the step (3). The preferable drying method is a method of heating and drying the battery can by induction heating (IH). According to this method, the water which has adhered to not only the outer face of the battery can but also the inner face can be removed in an easy and reliable manner.

Also, between the step (3) and the step (4), it is preferable to perform a step (3a) of spraying air on the battery can to remove most of the water which has adhered to the battery can. In the step (3a), most of the water is removed. Thus, in the step (4), the remaining small amount of water can be easily removed by heating and drying, so quicker and reliable removal of the water from the battery can surface is possible.

The washing water having a conductivity of 80 µS/cm or less used in the step (3) can be prepared, for example, by passing tap water or industrial water through at least one of a reverse osmosis membrane (RO membrane) or an ion exchange resin. An RO membrane has a property of removing impurities such as ions and salts contained in water. An ion exchange resin has a higher ion-removing capability than an RO membrane. An RO membrane or an ion exchange resin may be suitably selected depending on the conductivity of the washing water or production cost. Also, they may be used in combination.

Referring now to drawings, an exemplary method for preparing water having a conductivity of 80 μS/cm or less used in the washing step (3) is described.

FIG. 1 is a flow chart showing a method (method 1) for preparing washing water used in the step (3). As shown in FIG. 1, tap water or industrial water 1 is fed to a filter 3 (e.g., activated carbon) using a pump 2. As a result, particles of impurities such as dirt in the tap water or industrial water 1 are removed. The water having passed through the filter 3 is then fed to an RO membrane 5 using a pump 4. The water having passed through the RO membrane 5 is used as the washing water in the step (3), and the drainage (concentrated drainage) is used as the washing water in the step (2). In this way, the use of the RO membrane allows the water conductivity to be adjusted to 5 to 20 μS/cm. In this case, when the RO membrane is used for a long period of time, it is commonly guaranteed that the water conductivity is 20 μS/cm or less. When the conductivity is set to 8 μS/cm or less, the RO membrane can be replaced slightly earlier.

Figure 2:
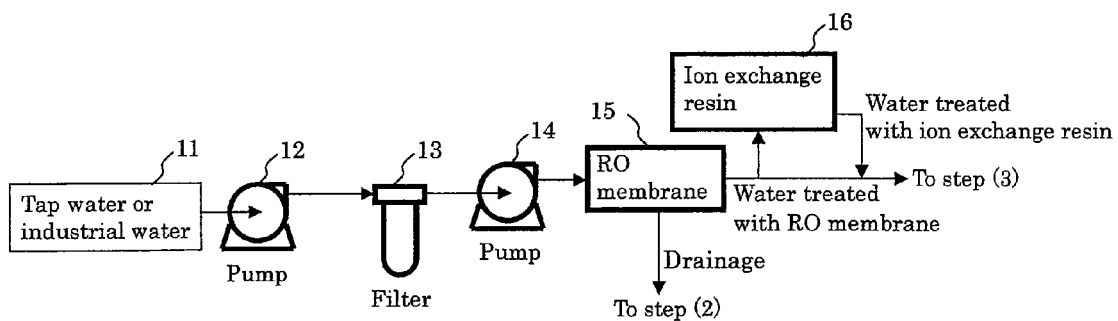
FIG. 2 is a schematic flow chart showing another method for preparing washing water used in the washing step of a battery can in a battery can production method of the invention.

FIG. 2 is a flow chart showing another method (method 2) for preparing washing water used in the step (3). As shown in FIG. 2, tap water or industrial water 11 is fed to a filter 13 (e.g., activated carbon) using a pump 12. As a result, particles of impurities such as dirt in the tap water or industrial water 11 are removed. The water having passed through the filter 13 is then fed to an RO membrane 15 using a pump 14. The water having passed through the RO membrane 15 is used as the washing water in the step (3), and the drainage is used as the washing water in the step (2). Further, part of the water having passed through the RO membrane 15 is fed to an ion exchange resin 16. The conductivity of the water having passed through the ion exchange resin 16 can be made 2 μS/cm or less.

The water having passed through the RO membrane 15 is mixed with the water having passed through the RO membrane 15 and the ion exchange resin 16, and the mixed water is used as the washing water. By installing a valve at the branch point, the amount of the water having passed through the RO membrane to be fed to the ion exchange resin, i.e., the mixing ratio of the mixed water can be adjusted. In this way, the conductivity of the washing water can be readily adjusted. The combined use of the RO membrane and the ion exchange resin permits the preparation of washing water having a conductivity of 8 μS/cm or less even when the RO membrane is used over a long period of time.

Figure 3:
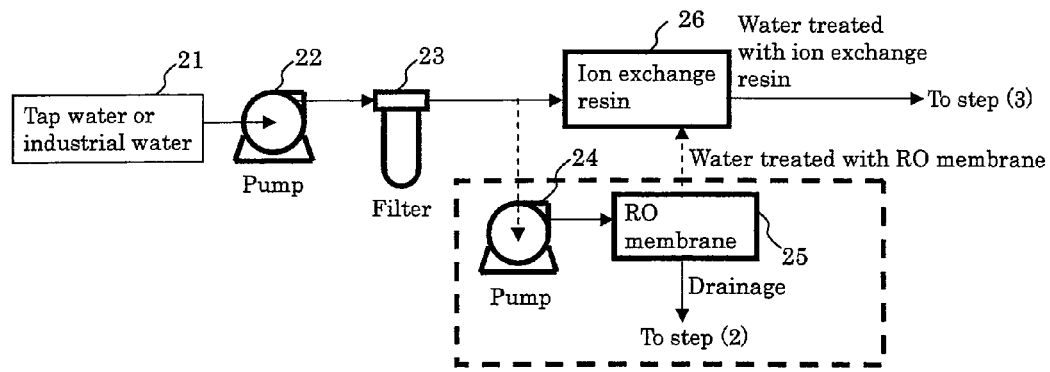
FIG. 3 is a schematic flow chart showing a still another method for preparing washing water used in the washing step of a battery can in a battery can production method of the invention.

FIG. 3 is a flow chart showing a still another method (method 3) for preparing washing water used in the step (3). As shown in FIG. 3, tap water or industrial water 21 is fed to a filter 23 (e.g., activated carbon) using a pump 22. As a result, particles of impurities such as dirt in the tap water or industrial water 21 are removed. The water having passed through the filter 23 is then passed through an ion exchange resin 26. In this way, the use of the ion exchange membrane allows the water conductivity to be adjusted to 2 μS/cm or less.

To extend the life of the ion exchange resin, an RO membrane may be additionally used. That is, as shown in the section surrounded by the broken line in FIG. 3, part of the water having passed through the filter 23 may be fed to an RO membrane 25 by using a pump 24 before being fed to the ion exchange resin 26.

For example, when the conductivity of the washing water is 2 μS/cm or less, method 3 is preferable. When the conductivity of the washing water is 2 to 8 μS/cm, method 2 is preferable. When the conductivity of the washing water exceeds 8 μS/cm, method 1 is preferable.

The conductivity of the washing water can be measured by using, for example, ES-14 of Horiba, Ltd. The water conductivity as used in the invention refers to conductivity at a temperature of 25° C.

The amounts of Ca and Mg adhering to the battery can surface can be determined, for example, by performing an ICP emission spectral analysis on a liquid sample that is prepared by immersing a battery can in dilute nitric acid of predetermined concentration and, in this state, applying ultrasonic vibrations thereto for a predetermined period of time. It is also possible to immerse the whole battery can in dilute nitric acid, or to put a weight in a battery can, fit a resin cover to the opening of the battery can, and immerse only the outer side of the battery can in dilute nitric acid.

It is also possible to use a battery for measurement. For example, it is possible to remove a label covering the outer face of a battery can and immerse the whole battery in dilute nitric acid. Alternatively, it is also possible to immerse only the part of a battery where the battery can is exposed, such as the terminal section, in dilute nitric acid.

Figure 4:
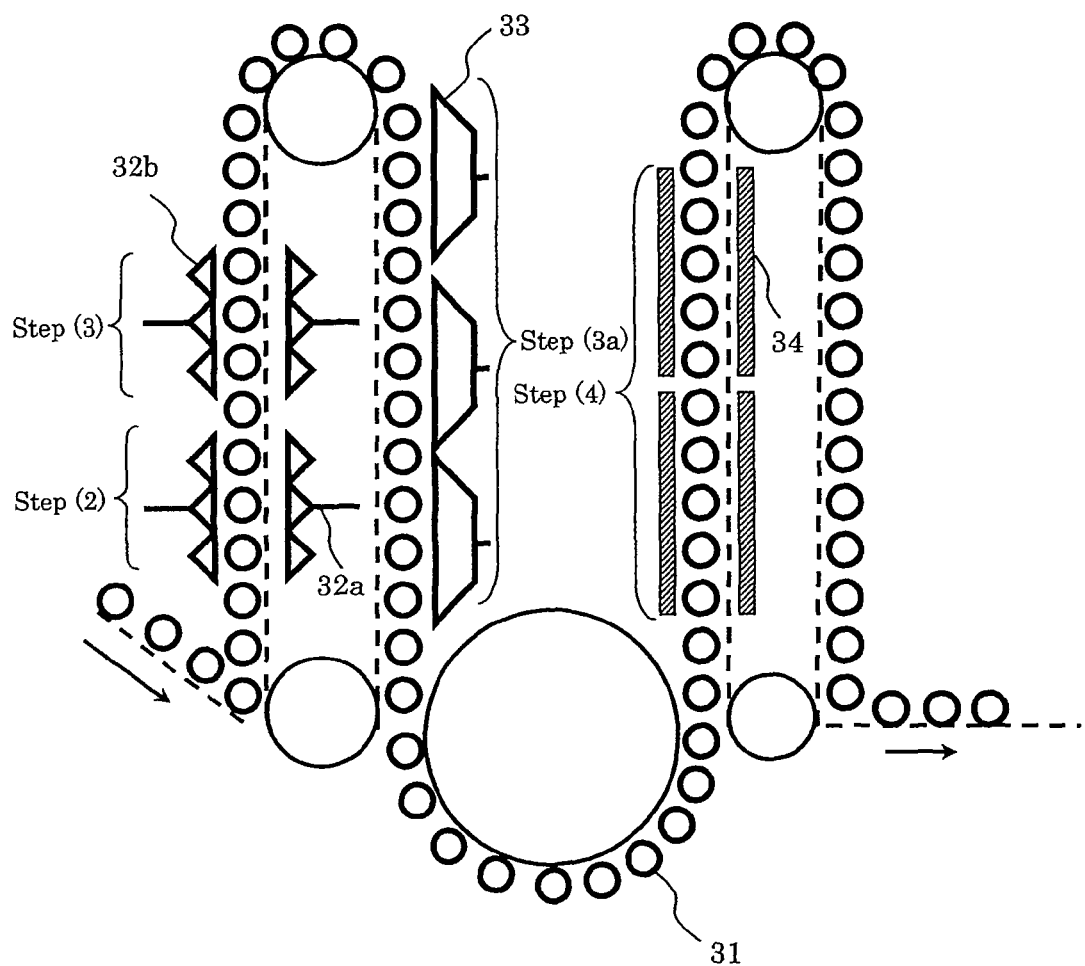
FIG. 4 is a schematic flow chart showing an exemplary process for washing and drying a battery can in a battery can production method of the invention.
Figure 5:
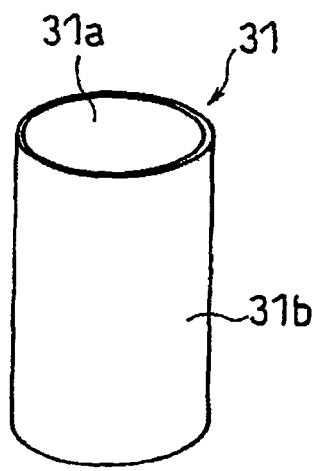
FIG. 5 is a perspective view of the cylindrical battery can with a bottom used in the process of FIG. 4.

Referring now to FIG. 4, an exemplary process for washing and drying in the battery can production method according to the invention is described. FIG. 4 is a schematic flow chart showing an exemplary process for washing and drying, seen from the horizontal direction. An explanation is given of a cylindrical battery can 31 having a bottom, an opening 31a, and a cylindrical side wall 31b as illustrated in FIG. 5, but the shape of the battery can is not to be construed as being limited to this. As illustrated in FIG. 4, the battery cans 31 obtained by the can-making process of the step (1) are transported by a conveyor (not shown) to a first washing step (2), a second washing step (3), a water-removing step (3a) by air spraying, and a drying step (4) in this order (in the direction shown by the arrow in FIG. 4). The transportation route is provided with: first shower nozzles 32a for spraying water toward the battery cans 31 in the first washing step (2); second shower nozzles 32b for spraying water toward the battery cans 31 in the second washing step (3); air nozzles for spraying air toward the battery cans 31 in the water-removing step (3a); and IH heaters 34 for heating and drying the battery cans 31 in the drying step (4). The number of the first shower nozzles 32a and the number of the second shower nozzles 32b are four, so that water can be sprayed toward the right side of the cylindrical side wall 31b, the left side of the cylindrical side wall 31b, the opening 31a, and the bottom. The number of air nozzles 33 is four, so that air can be sprayed toward the right side of the cylindrical side wall 31b, the left side of the cylindrical side wall 31b, the opening 31a, and the bottom.

The IH heaters 34 are disposed on both sides of the transportation route, so that they face the cylindrical side walls 31b of the battery cans 31. Since moisture evaporated from the surfaces of the battery cans 31 diffuses upward, the water does not cause a failure of the IH heaters 34 due to adhesion to the IH heaters 34.

The conveyor (e.g., chain conveyor or belt conveyor) is equipped with magnets for securing the battery cans 31 at certain intervals. In the steps (1) to (4), the battery cans 31 are placed so that the axial directions are substantially parallel to the horizontal direction, and the battery cans 31 are transported by the conveyor with part of the cylindrical side wall 31b of each of the battery cans 31 secured by the magnet.

Also, besides the manner as described above, in the step (4), the battery cans 31 may be transported with the openings 31a of the battery cans 31 placed on the conveyor facing upward. Since moisture evaporated from the surfaces of the battery cans 31 diffuses upward, moisture adhering to the inner faces of the battery cans 31 can also be removed efficiently.

When the cylindrical battery cans 31 with bottoms obtained by the can-making process of the step (1) are transported to the area in front of the first shower nozzles 32a, tap water or industrial water is sprayed toward the battery cans 31 by the first shower nozzles 32a, so that the surfaces (outer faces and inner faces) of the battery cans 31 are washed with the tap water or industrial water (step (2)). As a result, materials having adhered in the can-making process, such as the lubricant, are removed.

When the battery cans 31 are transported to the area in front of the second shower nozzles 32b, water having a conductivity of 80 µS/cm or less is sprayed toward the battery cans by the second shower nozzles 32b, so that the surfaces of the battery cans 31 are washed with the water having a conductivity of 80 µS/cm or less (step (3)). As a result, such components as Mg and Ca contained in the tap water or industrial water are removed.

The first shower nozzles 32a and the second shower nozzles 32b may constantly spray water. Alternatively, the operations of the first shower nozzles 32a and the second shower nozzles 32b may be controlled such that they spray water when the battery cans 31 are transported to the area in front of the first shower nozzles 32a and the second shower nozzles 32b.

When the battery cans 31 are transported to the area in front of the air nozzles 33, air is sprayed from the air nozzles 33 (step (3a)). As a result, most of the water on the surfaces of the battery cans 31 is removed. Air may be constantly sprayed. Alternatively, the operations of the air nozzles 33 may be controlled such that they spray air when the battery cans 31 are transported to the area in front of the air nozzles 33.

When the battery cans 31 are transported to the area in front of the IH heaters 34, the battery cans 31 are heated and dried by induction heating by the IH heaters 34 (step (4)). As a result, the water on the surfaces (outer faces and inner faces) of the battery cans 31 is removed. By adjusting the heating temperature of the IH heaters 34, the distance between the IH heaters 34 and the battery cans 31, etc., the battery cans 31 are heated, for example, to approximately 120 to 220° C.

Figure 6:
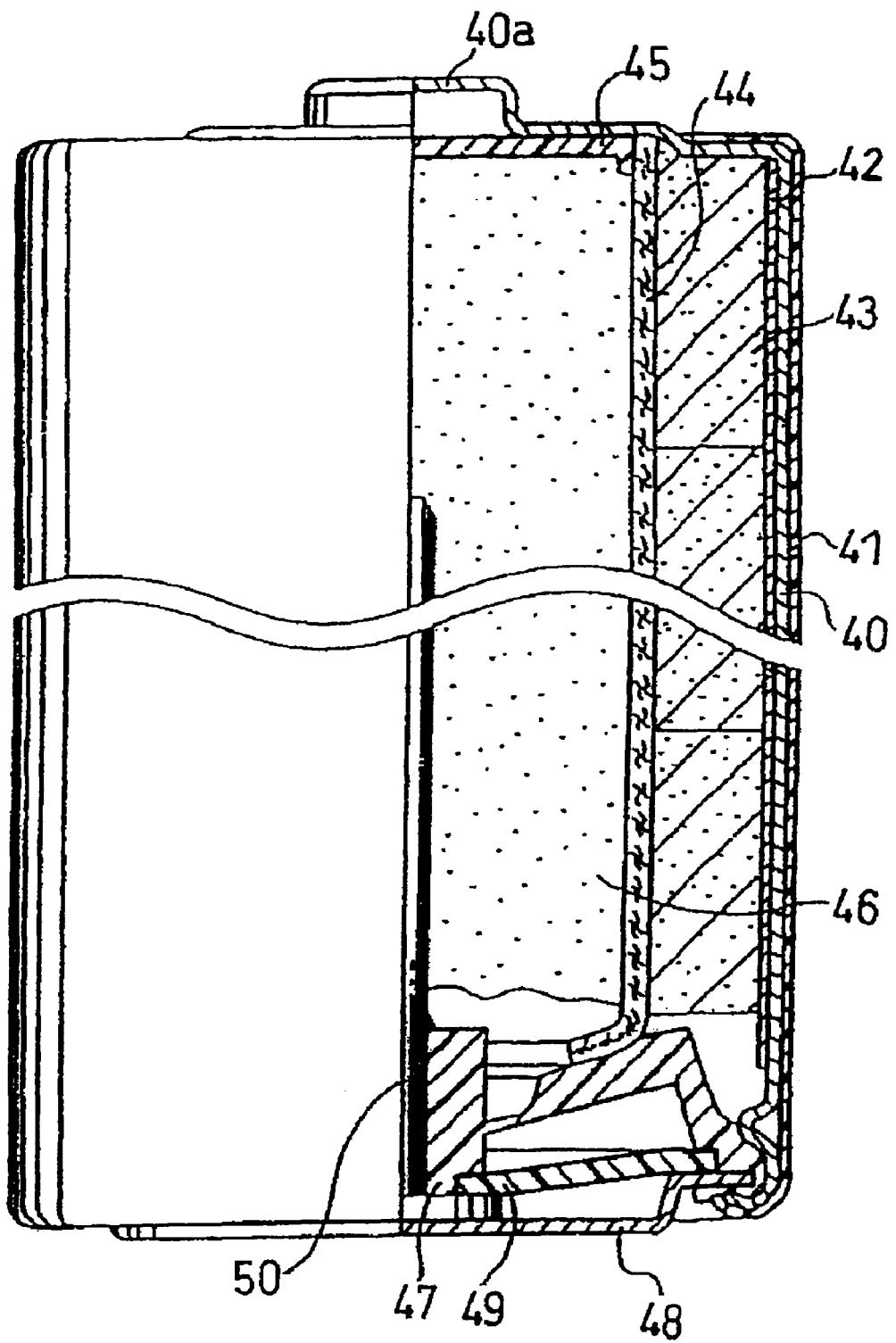
FIG. 6 is a partially sectional front view of a cylindrical alkaline dry battery which is one embodiment of a battery using a battery can of the invention.

Referring now to FIG. 6, one embodiment of the battery using the battery can of the invention is described. FIG. 6 is a partially sectional front view of a D-size cylindrical alkaline dry battery (LR20).

A cylindrical battery can 40 with a bottom serves as a positive electrode terminal 40a, and has an inner face on which a conductive coating film 42 is formed. The conductive coating film 42 can be formed, for example, by applying a predetermined amount of a graphite paint onto the inner face of the battery can 40 after the step (4). The graphite paint can be prepared, for example, by dispersing graphite and a resin binder in water or a non-aqueous dispersion medium. In terms of working environment, the dispersion medium is preferably water. A plurality of hollow cylindrical positive electrode mixtures 43 are disposed in the battery can 40 so that they contact the conductive coating film 42 formed on the inner face of the battery can 40. The positive electrode mixture 43 comprises a mixture of manganese dioxide serving as a positive electrode active material, graphite as a conductive agent, and an alkaline electrolyte. The alkaline electrolyte can be, for example, an aqueous solution of 36% by weight of potassium hydroxide.

The hollow formed by the positive electrode mixtures 43 is filled with a gelled negative electrode 46. A separator 44 is disposed between the gelled negative electrode 46 and the positive electrode mixtures 43, and a bottom paper 45 is disposed between the gelled negative electrode 46 and the battery can 40. The gelled negative electrode 46 comprises, for example, a mixture of a gelling agent such as sodium polyacrylate, an alkaline electrolyte, and a negative electrode active material. The negative electrode active material is zinc, or a zinc alloy containing at least one selected from the group consisting of Al, Bi, and In. The separator 44 is, for example, non-woven fabric composed mainly of polyvinyl alcohol fibers and rayon fibers.

A negative electrode current collector 50 is inserted into the gelled negative electrode 46. The negative electrode current collector 50 is integrally combined with a resin seal member 47, a bottom plate 48 serving as a negative electrode terminal, and an insulating washer 49 in advance. The open edge of the battery can 40 is crimped onto the circumference of the bottom plate 48 with the peripheral edge of the seal member 47 interposed therebetween. In this way, the battery can 40 is sealed. The outer surface of the battery can 40 is covered with an outer label 41.

In the case of this alkaline dry battery, the amount of Ca or Mg adhering to the battery can can be determined, for example, by performing an ICP emission spectral analysis on a liquid sample that is prepared by removing the outer label 41 and immersing the whole battery in dilute nitric acid of 0.1 M, or by immersing the positive electrode terminal 40a of the battery in dilute nitric acid and, in this state, applying ultrasonic vibrations thereto for 5 minutes. From the area of the part immersed in the dilute nitric acid, the amount of Ca or Mg adhering to unit area can be calculated.

In addition to the above-described battery, the battery can of the invention can be used as a battery can for, for example, nickel-metal hydride storage batteries, nickel-cadmium batteries, or lithium batteries.

EXAMPLES

Examples of the invention are hereinafter described in detail, but the invention is not to be construed as being limited to these Examples.

Examples 1 to 6

Cylindrical battery cans (outer diameter 32.7 mm and height 63.5 mm) with bottoms for D-size alkaline dry batteries (LR20) were produced in the following procedure.
(A) Can-making Step A nickel plated steel plate (thickness 0.5 mm) was subjected to a DI process to obtain a cylindrical battery can 31 with a bottom as illustrated in FIG. 5 (step (1)). In the DI process, a cup-shaped intermediate work product was produced by a deep drawing step using a press, and the cup-shaped intermediate work product was successively drawn and ironed at one time. As the steel plate to be plated with nickel, an aluminum killed steel plate corresponding to SPCE of JIS (Japanese Industrial Standards) was used as a cold-rolled steel plate. In the step (1), CFS-100 of NEOS COMPANY LIMITED was used as a water-soluble lubricant to assist the process of the steel plate and prevent the steel plate from breaking during the process.
(B) Steps for Washing and Drying Battery Can The battery cans 31 produced in the above manner were washed and then dried. The same process as that illustrated in FIG. 4 was used for washing and drying the battery cans 31. As the washing water of the step (2), tap water (conductivity: 213 µS/cm) having a temperature of 50° C. was used. The conductivity of the washing water used in the step (3) was changed to values shown in Table 1. Ion exchange water was used as water having a conductivity of 0.1 μS/cm. Also, to prepare water having other conductivities, ion exchange water was mixed with tap water for convenience sake. Water conductivity was measured by using ES-14 of Horiba, Ltd.

gauge used was PUSH-PULL (SCALE MAX 20N) of IMADA CO., LTD. At this time, the contact load was set to 4.9 N or 9.8 N, and when the contact resistance was 10 mΩ or less, it was determined that the contact resistance was good.

Table 1 shows these evaluation results.

TABLE 1

|  | Conductivity of washing water (μS/cm) | Amount of Ca adhering to battery can surface (μg/cm$^2$) | Amount of Mg adhering to battery can surface (μg/cm$^2$) | Number of battery cans with rust | Contact resistance (mΩ) | |
|---|---|---|---|---|---|---|
|  |  |  |  |  | Load 4.9 N | Load 9.8 N |
| Example 1 | 0.1 | 0.0049 | 0.00027 | 0 | 4.7 | 4.7 |
| Example 2 | 1 | 0.0050 | 0.00027 | 0 | 4.7 | 4.8 |
| Example 3 | 8 | 0.0051 | 0.00028 | 0 | 4.9 | 4.8 |
| Example 4 | 20 | 0.0055 | 0.00030 | 0 | 6.1 | 5.1 |
| Example 5 | 50 | 0.0062 | 0.00034 | 0 | 6.6 | 5.2 |
| Example 6 | 80 | 0.0070 | 0.00040 | 0 | 8.4 | 5.1 |
| Comparative Example 1 | 150 | 0.0087 | 0.00048 | 1 | 13.3 | 8.9 |
| Comparative Example 2 | 213 | 0.0103 | 0.00056 | 4 | 27.1 | 15.6 |

The temperature of the washing water used in the step (3) was set to 20° C. In the step (4), the battery cans were heated to approximately 175° C. for drying. After the step (4), a protrusion (a part outwardly protruding from the battery can) serving as an external terminal (positive electrode terminal) was formed in the center of the bottom of the battery can.

Comparative Examples 1 and 2

The conductivity of the washing water used in the step (3) was set to 150 μS/cm or 213 μS/cm. Tap water was used as water having a conductivity of 213 μS/cm. Water having a conductivity of 150 μS/cm was prepared by mixing tap water with ion exchange water to adjust the conductivity. Except for this, in the same manner as in Example 1, battery cans were produced.

Each of the battery cans of Examples 1 to 6 and Comparative Examples 1 and 2 was evaluated as follows.
[Evaluation]
(1) Measurement of Amounts of Ca and Mg Adhering to Battery Can Surface A sample solution was prepared by immersing a whole battery can in dilute nitric acid having a concentration of 0.1 M in a resin cup and, in this state, applying ultrasonic vibrations thereto for 30 seconds. This sample solution was subjected to an ICP emission spectral analysis to obtain the amounts of Ca and Mg adhering to the battery can. The ICP emission spectral analysis was performed using VISTA-RL of VARIAN, INC.
(2) Examination of Battery Can for Rust Five battery cans were prepared for each of Examples and Comparative Examples, and left in an atmosphere having a temperature of 60° C. and a humidity of 90% for two months. Then, the inner and outer parts of the battery cans were visually inspected for rust. When red brown spots were found, it was determined that rust was formed on the battery can.
(3) Measurement of Contact Resistance of Battery Can A measuring terminal plated with gold was attached to the tip of a force gauge, and bought into contact with an end of a battery can. A Ni lead was welded to the side face of the battery can. While a load was applied, the resistance between the measuring terminal and the Ni lead was measured by using a resistance meter. This was defined as the contact resistance of the battery. The resistance meter used was AC Milliohm HiTester 3560 of Hioki E.E. Corporation. The force In Examples 1 to 6 in which the conductivity of the washing water of the step (3) is 80 μS/cm or less, the amount of Ca adhering to the battery can surface is 0.007 μg/cm$^2$ or less, and the amount of Mg is 0.0004 μg/cm$^2$ or less. In these battery cans, rust was not formed. Contrary to this, in Comparative Examples 1 and 2 in which the conductivity of the washing water of the step (3) exceeds 80 μS/cm, some battery cans were found to have rust. Also, in the battery cans of Examples 1 to 6, the contact resistance was significantly low, compared with the battery cans of Comparative Examples 1 and 2.

In particular, in the case of the battery cans of Examples 1 to 3 in which the conductivity of the washing water of the step (3) is 8 μS/cm or less, the contact resistance was as low as less than 5 mΩ. Also, the preferable conductivity of the washing water is 1 μS/cm or more since a rise in production costs on the mass production level is suppressed. In terms of the contact resistance and production cost of the battery cans, it has been found that the preferable conductivity of the washing water of the step (3) is 1 to 8 μS/cm.

Example 7

Twenty battery cans were prepared for each of Examples 1 to 6 and Comparative Examples 1 and 2. These battery cans were stored in an environment having a temperature of 30° C. and a humidity of 75% to simulate the weather condition of summer for one month. Thereafter, using these battery cans, D-size cylindrical alkaline dry batteries (LR20) as illustrated in FIG. 6 were produced in the following procedure.
(1) Preparation of Positive Electrode Mixture Manganese dioxide powder (mean particle size 45 μm) serving as a positive electrode active material, graphite powder (mean particle size 15 μm) as a conductive agent, and an aqueous solution containing 35% by weight of potassium hydroxide and 2% by weight of zinc oxide as an alkaline electrolyte were mixed in a weight ratio of 90:10:2. The mixture was sufficiently stirred and pressed into flakes. The positive electrode mixture flakes were crushed into granules, which were then classified with a sieve. Granules of 10 to 100 mesh were pressure molded into hollow cylinders to obtain positive electrode mixture pellets 43.
(2) Preparation of Gelled Negative Electrode A gelled negative electrode 46 was prepared by mixing sodium polyacrylate serving as a gelling agent, an aqueous solution of 35% by weight of potassium hydroxide as an alkaline electrolyte, and a zinc powder (mean particle size 150 μm) as a negative electrode active material in a weight ratio of 1.8:100:180.

(3) Fabrication of Cylindrical Alkaline Dry Battery

A graphite paint was applied onto the inner face of the side wall of a battery can 40 and dried to form a conductive coating film 42. The graphite paint was prepared by dispersing graphite and carbon black together with a binder composed mainly of an acrylic resin in water. In the conductive coating film 42, the amount of graphite was 47% by weight, the amount of carbon black was 35% by weight, and the amount of binder was 18% by weight.

The positive electrode mixture pellets 43 obtained in the above manner were inserted into the battery can 40, and the positive electrode mixture pellets 43 were pressed again by a compression device, so that they closely adhered to the inner wall of the battery can 40. A separator 44 and an insulating cap 45 were disposed on the inner face of the hollow of the positive electrode mixtures 43 closely adhering to the inner wall of the battery can 40 and the inner face of the bottom of the battery can 40. A predetermined amount of an aqueous solution of 40% by weight of potassium hydroxide was injected as an alkaline electrolyte into the separator 44. After a predetermined period of time, the gelled negative electrode 46 obtained in the above manner was filled into the separator 44. The separator 44 used was non-woven fabric composed mainly of polyvinyl alcohol fibers and rayon fibers.

A negative electrode current collector 50 was inserted into the gelled negative electrode 46. The negative electrode current collector 50 was integrally combined with a resin seal member 47, a bottom plate 48 serving as a negative electrode terminal, and an insulating washer 49 in advance. The open edge of the battery can 40 was crimped onto the circumference of the bottom plate 48 with the seal member 47 interposed therebetween, to seal the opening of the battery can 40. The outer surface of the battery can 40 was covered with an outer label 41. In this way, an alkaline dry battery was produced.

In the above-described manner of battery fabrication, 20 batteries were produced with respect to each of the battery cans of Examples and Comparative Examples. To evaluate the leakage-resistance characteristics of these batteries, they were stored in an environment having a temperature of 80° C. and a humidity of 30% for three months to conduct an accelerated test. As a result, in the case of the batteries using the battery cans of Comparative Examples 1 and 2, two batteries and four batteries leaked probably due to the rusting of the battery cans, respectively. However, in the case of the batteries using the battery cans of Examples 1 to 6, no leakage occurred in any case.

INDUSTRIAL APPLICABILITY

The battery can of the invention is advantageously used as a housing of an alkaline manganese battery, nickel-metal hydride storage battery, nickel-cadmium battery, lithium battery, etc.

The invention claimed is:

1. A method for producing a battery can, comprising the steps of:
   (1) producing a battery can having a cylindrical side wall, a bottom, and an opening from a steel plate by a can-making process;
   (2) washing the battery can with tap water or industrial water;
   (3) washing the battery can with water having a conductivity of 80 μS/cm or less after the step (2); and
   (4) drying the battery can after the step (3).

2. The method for producing a battery can in accordance with claim 1, wherein the conductivity of the water used in the step (3) is 1 to 20 μS/cm.

3. The method for producing a battery can in accordance with claim 1, wherein the conductivity of the water used in the step (3) is 1 to 8 μS/cm.

4. The method for producing a battery can in accordance with claim 1, wherein the temperature of the tap water or industrial water used in the step (2) is 35 to 70° C.

5. The method for producing a battery can in accordance with claim 1, wherein a water-soluble lubricant is used in the can-making process.

6. A battery can having a cylindrical side wall, a bottom, and an opening and comprising a steel can, wherein the amount of Ca adhering to a surface of the battery can is 0.007 μg/cm$^2$ or less.

7. The battery can in accordance with claim 6, wherein the amount of Ca adhering to a surface of the battery can is 0.0051 μg/cm$^2$ or less.

8. A battery can having a cylindrical side wall, a bottom, and an opening and comprising a steel can, wherein the amount of Mg adhering to a surface of the battery can is 0.0004 μg/cm$^2$ or less.

9. The battery can in accordance with claim 8, wherein the amount of Mg adhering to a surface of the battery can is 0.00028 μg/cm$^2$ or less.

10. A battery comprising the battery can of claim 6.

11. The battery in accordance with claim 10, wherein said battery is an alkaline dry battery.

12. A battery comprising the battery can of claim 7.

13. The battery in accordance with claim 12, wherein said battery is an alkaline dry battery.

14. A battery comprising the battery can of claim 8.

15. The battery in accordance with claim 14, wherein said battery is an alkaline dry battery.

16. A battery comprising the battery can of claim 9.

17. The battery in accordance with claim 16, wherein said battery is an alkaline dry battery.

* * * * *